(No Model.) 4 Sheets—Sheet 1.
C. L. MITCHELL.
DEVICE FOR THE CONSUMPTION OF LIQUID FUEL.
No. 351,390. Patented Oct. 26, 1886.
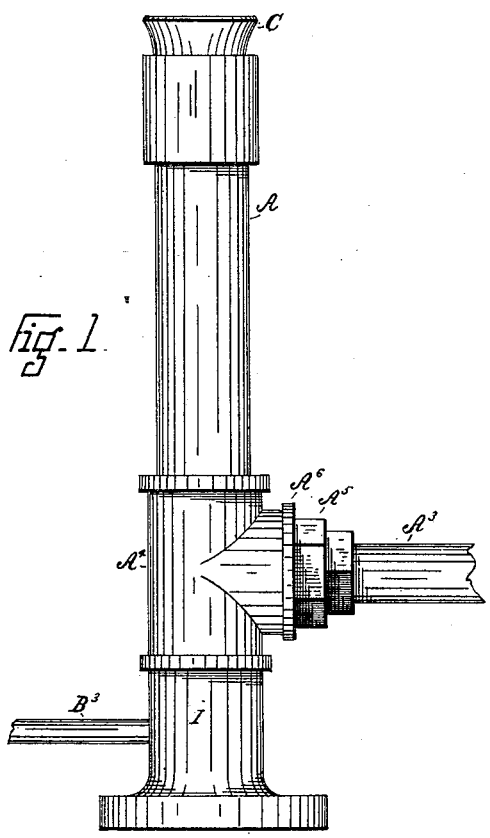
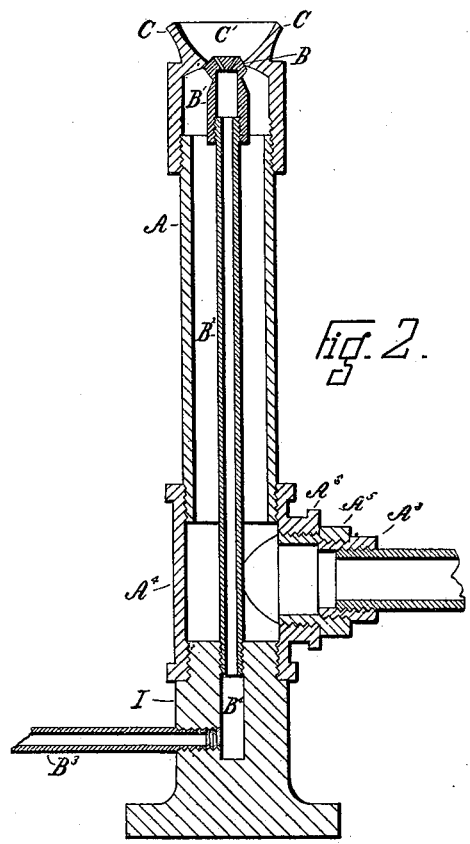
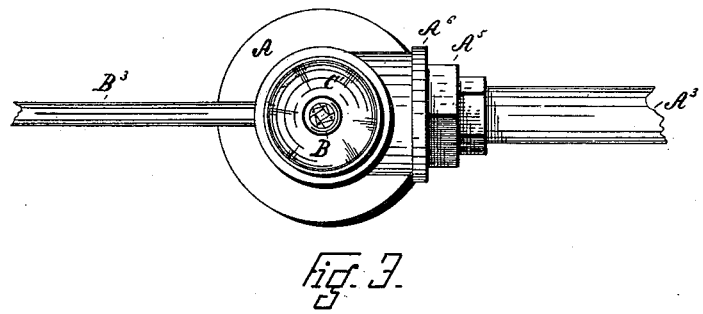
Attest
Walter Chamberlin
O. M. Hill
Inventor
Charles L. Mitchell
per Wm. Hubbell Fisher,
Atty.

(No Model.) 4 Sheets—Sheet 2.
C. L. MITCHELL.
DEVICE FOR THE CONSUMPTION OF LIQUID FUEL.
No. 351,390. Patented Oct. 26, 1886.

Attest
Walter Chamberlin.
O. M. Hill

Inventor
Charles L. Mitchell
per Wm. Hubbell Fisher,
Atty.

(No Model.) 4 Sheets—Sheet 3.
C. L. MITCHELL.
DEVICE FOR THE CONSUMPTION OF LIQUID FUEL.
No. 351,390. Patented Oct. 26, 1886.
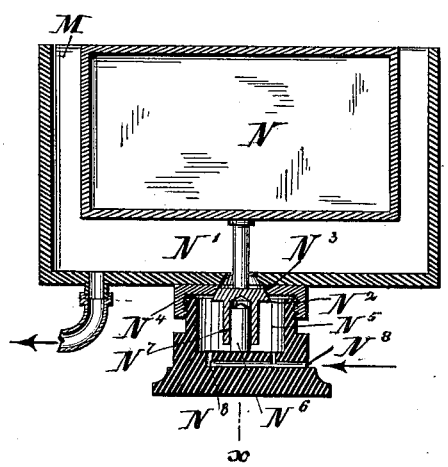
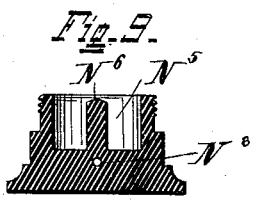
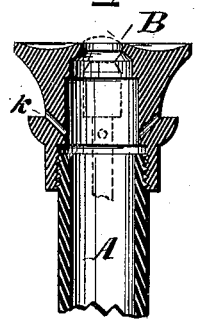
Attest
Jno. W. Strehli
O. M. Hill
Inventor
Charles L. Mitchell
per Wm. Hubbell Fisher
Atty.

(No Model.)  4 Sheets—Sheet 4.
C. L. MITCHELL.
DEVICE FOR THE CONSUMPTION OF LIQUID FUEL.
No. 351,390.  Patented Oct. 26, 1886.
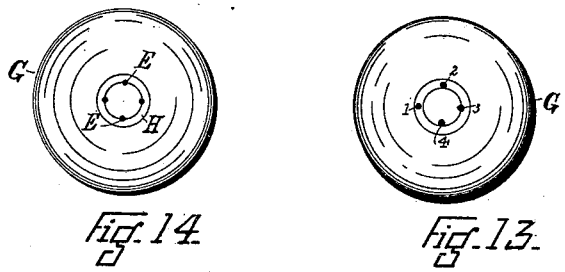
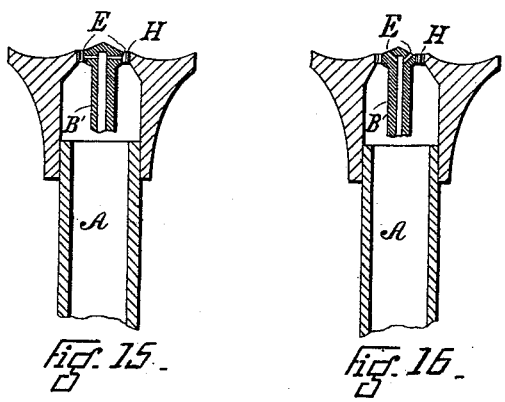
Attest
Walter Chamberlin.
O. M. Hill
Inventor
Charles L. Mitchell
per Wm. Hubbell Fisher,
Atty.

UNITED STATES PATENT OFFICE.

CHARLES L. MITCHELL, OF COVINGTON, KENTUCKY.

DEVICE FOR THE CONSUMPTION OF LIQUID FUEL.

SPECIFICATION forming part of Letters Patent No. 351,390, dated October 26, 1886.

Application filed February 25, 1884. Serial No. 122,030. (No model.)

*To all whom it may concern:*

Be it known that I, CHARLES L. MITCHELL, residing in Covington, in the county of Kenton and State of Kentucky, have invented certain new and useful Improvements in Devices for the Consumption of Liquid Fuel, of which the following is a specification.

The several features of my invention, and the various advantages resulting from their use, conjointly or otherwise, will be fully apparent from the following description.

Figure 4:
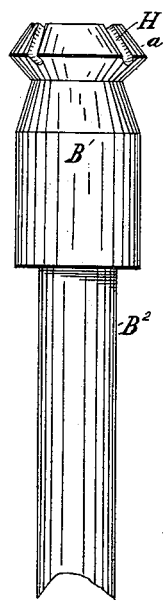
Figure 5:
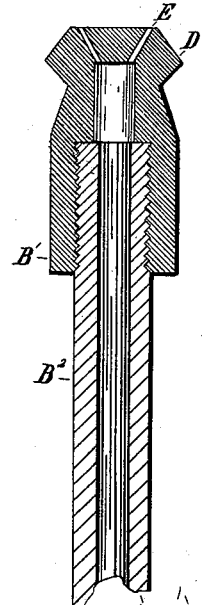
Figure 6:
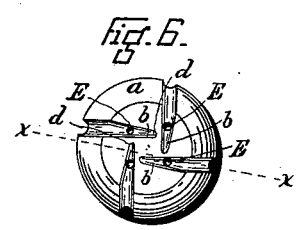
Figure 11:
Figure 7:
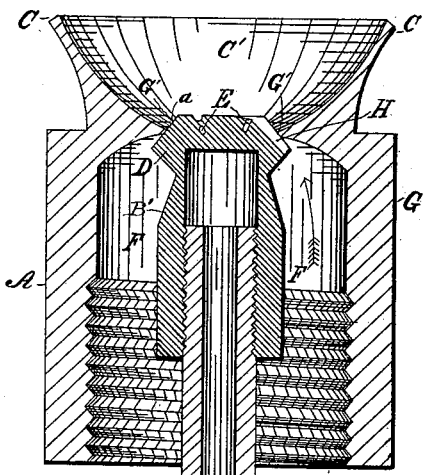
Figure 12:

In the accompanying drawings, Figure 1, Sheet 1, represents a side elevation of a device illustrating certain features of my invention entering into the preferred construction of my burner. Fig. 2, same sheet, represents a vertical central section of said device, taken through the longitudinal axis of the feed or supply pipe. Fig. 3, same sheet, represents a plan view of the said device. Fig. 4, Sheet 2, represents a side elevation of the head, crown, or tip of the conduit for supplying liquid fuel to the burner, which tip is located within the conduit or shell for supplying air or other gas to the burner. Fig. 5 represents a central vertical section of the device shown in Fig. 4. Fig. 6 represents a top view of the device shown in Fig. 4. Fig. 7 represents a vertical section of the device shown in Fig. 4, and of the upper portion or cap of air-inclosing conduit or shell for supplying air or other gas to the burner, the said section being central as to said inclosing-shell, but as to the device shown in Fig. 4 being taken a little to one side of the center—viz., in the plane of the dotted lines $x\,x$. (Shown in Fig. 6.) Fig. 8, Sheet 3, represents a vertical central section of a preferred form of device for automatically regulating the supply of liquid fuel from the fuel-reservoir to one or more burners. Fig. 9, same sheet, represents a vertical central section of the lower portion of the device shown in Fig. 8, said section being taken at right angles to the plane of the section taken in Fig. 8. Fig. 10, same sheet, represents a vertical central section of a burner, illustrating my invention and showing a modification in the construction of the exterior shell or conduit for supplying air or other gas to the liquid fuel. Fig. 11, Sheet 2, represents one of the various forms the flame of a burner may assume; and Fig. 12, same sheet, represents another of the forms the flame may assume. Figs. 13 and 14, Sheet 4, represent plan views of the heads of burners, illustrating certain modes of carrying into effect certain features of my invention. Fig. 15, same sheet, represents a vertical central section of the device shown in Fig. 14; and Fig. 16 represents a vertical section of the head of a burner, showing a slightly different arrangement of orifices than is shown in Fig. 15.

The liquid fuel to be used may consist of coal-oil, petroleum, crude or refined, of alcohol, or other combustible liquid.

A indicates a shell or conduit for the conveyance or conduction of air or other gas to the burner. The upper or free end of this shell, which may be denominated as "cap G," is contracted, forming inwardly-projecting annular flange or collar G'. Above the collar G' the end of said conduit A may be substantially flat, as shown in Fig. 10, or formed in any suitable manner consistent with the purposes of my invention. Preferably the cap G is provided with an upwardly-extending wall, C, usually annular, and forming a cup-shaped cavity, C', for the purposes hereinafter specified.

$B^2$ indicates the conduit for the conveyance of the liquid fuel, provided at its upper or free end with a crown or tip, D, containing perforations E, connecting the interior space of the conduit with the exterior air. Each of these perforations E is preferably inclined, so that as they pass through the tip toward the interior of conduit $B^2$ they converge toward the longitudinal center of said conduit, substantially as shown in Fig. 5, Sheet 2. The flange B fits closely against the periphery or outer surface of said tip D in the preferred form of construction as shown in Figs. 2 and 7. For the purpose of furnishing communication between the space above said tip and the space F, within said conduit A, but outside of conduit $B^2$, conduits H are provided. These conduits may be formed in the flange B of conduit A or through the tip D of conduit $B^2$. Preferably, when the edge $a$ of the crown is beveled, these conduits H lie in the outer edge surface of the tip, as shown more particularly in Figs. 4 and 7, and thus form channels or gutters. These conduits H are preferably inclined, substantially as shown; but supposing the length of the conduits A and B² to be vertical, as shown in the figures, a vertical plane passing through any one of these conduits would preferably pass to one side of the longitudinal center of said conduit B². That portion, b, of conduit H which is nearest the center of the tip D, has preferably less of an inclination than the other or outlying part of conduit, and, furthermore, diminishes in width and depth as it approaches its end d. In each of these conduits H is located the upper end of one of the orifices E.

This portion of my invention operates as follows: Liquid fuel is supplied to conduit B², air or other gas being supplied to conduit A and driven forward by a blower, thereby filling the space F and then finding rapid exit through the conduit H. As the air or gas passes through and out of these conduits, it assumes the form of a stream or cylindrical current moving with great velocity. Such movement of said air or gas produces a suction through fuel-conduit B², which draws the liquid fuel rapidly through said conduit and through said perforations or orifices E. The liquid fuel, drawn rapidly through said orifices E, issues from each of said orifices in a stream, and is then instantly met by the current of air or gas coming from and through the adjacent conduit H, and is sprayed or divided into exceedingly minute particles, forming a vapor. The liquid fuel in coming through its orifice E acquires a momentum in the direction of its orifice, and therefore, if uninterruptedly left to follow the course it commenced in said orifice, would be projected upward and outward in a compact stream far beyond the outer periphery of the shell or conduit A; but being met by the current of gas or air rushing through its adjacent conduit H, the stream of liquid fuel is changed into a vaporous or fine spray, which extends quite a distance above and also horizontally beyond the edge of the conduit A, as shown by dotted lines in Fig. 11. Thus, where there are three or more of the orifices E and corresponding air-conduits H arranged at regular intervals in a circle in the burner, the liquid fuel forms a spray, which takes a shape whose horizontal diameter is a number of times greater than the diameter of the conduit A. This spray being lighted, a perfect and rapid combustion of the entire fuel takes place and a great heat is generated.

The cost of such a combustion in proportion to the amount of heat generated is very slight. Furthermore, it will be found that the heat thus generated does not in any wise heat the burner, but that after the vapor has been burning any length of time and the combustion is stopped all parts of the burner will be cool and sometimes cold. The combustion is instantly checked by stopping the flow of air or gas through the conduits H.

Any remains of the unconsumed liquid fuel that may be issuing from the orifice E at the time when the flow of air or gas shall be stopped will be caught in the cup or cavity C'.

Should the conduits H, aforementioned, be incapable of maintaining a perfect spray on account of the thickness or consistency of the streams of liquid fuel issuing from the orifices E, or because of the tackiness of the said fuel, or on account of the coarseness of the spray, a series of auxiliary holes may be provided, located below the conduits H, and so directed outwardly as to carry up and into contact with the flame any spray or portion of the fuel which might otherwise fall below said flame and be wasted. A convenient and desirable mode of employing these supplemental holes is that shown in Fig. 10, Sheet 3, where $k$ indicates the auxiliary holes located in a collar of the outer shell, A, and the flame of such a burner will be substantially of the shape shown in Fig. 12.

Generally it may be remarked that any burner or set of burners may be adjusted to a greater or less consumption of fuel by changing the number or size of the orifices.

The fineness of the spray may be adjusted differently for different burners by using conduits of different sizes or inclinations. The shape of the body of the spray viewed as an entirety, and consequently of the flame, can be altered by changing the inclination and direction of the orifices, and consequently of the conduits, and by variations in the shape of the burner-cap.

If air is used, it may be cold air, or, if a hotter flame is wanted or economy desired, by utilizing the otherwise wasted heat the air may be first heated.

The liquid fuel should be regulated to stand in the tube B² (or if there be more than one, then in the tubes B²) at nearly a fixed height, so as to insure regularity of the fire. The closer the fuel stands to the top of its tube B² the less pressure of air or gas is required to raise and convert it into spray. It should, however, be noted that the pressure of air or gas required to feed the burner, convert the liquid fuel into spray, &c., is comparatively light, and should be regulated so as to be constant within certain limits, which limits will vary according to the construction of the burner. Within these limits the intensity of the fire or flame may be increased or diminished by increase or decrease of pressure.

As the oxygen for combustion is supplied by pressure, no draft is required or waste of heat for that purpose. All the heat may be utilized; also, the fire by automatic change of this pressure and by automatic use of a suitable valve, one form of which is shown at Figs. 8 and 9, for regulating the supply of the liquid fuel, may be made to regulate itself. The foregoing remarks apply not only to single burners, but also to two or more burners.

In practice a convenient mode of constructing the upper portion of the burner and its connections is as follows: The tip B is provided below with an extension in the shape of a tube, B', and this is provided with a female screw-thread engaging a screw-thread on the tube B², through which passes the liquid fuel. The cap G of the shell A is likewise provided below with a tubular extension having a female screw-thread engaging a screw-thread on the tube or shell A, through which flows the air.

The construction of the bottom portion of the burner may be greatly varied. A desirable form is shown in Sheet 1 of the drawings, where shell A screws into the upper end of a T-joint, A⁴. The lower end of this T-joint is screwed to a standard, I. Into the side of the T-joint A⁴ is screwed the air or gas supply pipe A³. In the top or upper portion of the standard I is screwed the fuel-supply pipe B², and in the side of the standard is screwed the fuel-supply pipe B³, connected to the fuel-supply pipe B² by the conduit B⁴ in the standard. When it is expected to alter the diameter of the supply tube or tubes, whether such tube or tubes are for supplying air, gas, or liquid fuel, provisions may be made for such adjustment, as illustrated in connection with the supply tube or pipe A³, Fig. 1. By employing a set or series of screw-thimbles, as A⁵ and A⁶, and by increasing or diminishing the number of these thimbles a tube of smaller or larger diameter may be used.

A desirable device for automatically controlling the supply of liquid fuel to the burner or burners is shown in Figs. 8 and 9. It consists as follows:

M indicates a tank or reservoir whose interior is suitably connected with the fuel pipe or pipes of the burner or burners, and contains a float, N. To the bottom of the latter is connected a vertical valve-stem, N', carrying at its lower end a valve, N², adapted to engage a seat, N³, in the top plate, N⁴, of the chamber N⁵. For the better guidance of this valve a stem, N⁶, projects into and nicely fits a central orifice, N⁷, of the valve, thus steadying the valve and always guiding it to its seat as the float rises. Liquid fluid is admitted to the lower part of chamber N⁵ by inlet N⁸, and flowing up through and past the valve fills the reservoir M and raises the float N, which latter raises the valve and shuts off the passage of fresh liquid fuel to the tank. As the liquid fuel in the reservoir is drawn out, the float again falls and fresh fuel is admitted to the reservoir, and the float again rises, cutting off the supply of fresh fuel. In this way a proper supply of fuel for the burner or burners to be fed is automatically maintained and automatically kept at a given level in the pipe or pipes B², and hence a constant and even supply of liquid fuel will be fed to the burner, and a flame of a constant strength can be easily and surely maintained. At the same time the liquid fuel is prevented from either rising above the level of the orifices, so as to flow from the tips, or falling so far below the level of the orifices as to require increased pressure to raise and vaporize it. The top plate, N⁴, is preferably screwed to the top of chamber N⁵.

The specific mode of construction of the burner-head shown in Fig. 7 is preferable, for the reason that such construction enables the liquid fuel to be formed into spray with a minimum amount of air or gas blast.

As to the relative advantage of locating the grooves in the tip or in the flange, it will be remarked that if the grooves are in the flange, then when the flange is screwed down, the grooves in the flange may not properly meet the fuel-orifices, whereas if the grooves are made in the tip each groove fits its orifice and the screwing down of the cap simply operates to cut off all communication except through the grooves. The latter mode of construction is of course preferable.

Obviously, the relative arrangement of the air or gas spraying current or currents and of the fuel orifice or orifices may be varied, and yet come within the scope of certain features of my invention. Among these various arrangements of the fuel orifice or orifices and the air or gas spraying current or currents, the following are selected for the purposes of illustration.

The air or gas conduits H may lie altogether in the cap, as conduit 1, Fig. 13; or lie in the cap but bounded on one side by the tip, as conduit 2, same figure; or lie partly in the cap and partly in the tip, as conduit 3, same figure; or lie in the tip, but bounded on one side by the cap, as conduit 4, same figure; or lie wholly within the tip, as will be the case when the tip and cap are one and integral with each other. Where the grooves lie in the cap it must be understood that said grooves incline forwardly and inwardly and first approach the center and then passing to one side of the center diverge therefrom; also, the spraying current may take the form of an uninterrupted annular sheet, the conduit H being then of an annular form, and the fuel orifice or orifices E may lie within or without the said annular conduit. For example, in Figs. 14, 15, and 16 they are shown as lying within the annular conduit H. In Figs. 15 and 16 a number of fuel-orifices are present.

While gas or air under pressure may be used to reduce the liquid fuel to a vaporous or fine spray at or after its issuance from the discharge-orifices of the burner, steam, or, preferably, steam and air, may be used, and the steam in this event is preferably under pressure, thus enabling a mechanical blower to be dispensed with.

I do not claim the combination of pipes for the conduction of superheated steam, inclined toward a single central oil-delivery pipe, the orifice of the latter being at a distance above the orifices emitting the superheated steam, the central oil-delivery pipe delivering a single vertical stream. In this device no arrangement of parts is shown whereby hydrocarbon oil in its liquid state could be atomized or finely divided so as to produce perfect combustion. Furthermore, such device is not designed or fitted to feed the oil to the flame. The steam simply acts upon oil, which flows of its own motion by force of gravity from the end of the burner. In my invention, on the other hand, the issuing streams of air, gas, or vapor do not converge or meet. They, on the contrary, separate so as to produce no direct interference, (i. e., until the streams have greatly expanded,) so that the petroleum which is atomized or finely divided as it issues from its orifices is carried by the air, gas, or vapor streams into an ever-expanding finely-divided spray. This result can be but imperfectly attained with one oil-orifice, and cannot be attained at all with steam-jets which converge to a point. In my invention each oil-orifice has its air, gas, or vapor conduits. This is necessary if liquid hydrocarbon oil is to be atomized perfectly. In the Wareham device there are several steam-conduits to one orifice, which, while suitable for the dissipating of hydrocarbon vapor, is unsuited to the atomizing of liquid oil. Nor do I claim the combination of a single central straight air-delivery pipe with a surrounding sheet of oil directed away from said central air-delivery pipe, but axially-inclined outward toward an annular row of steam-conduits inclined at an angle, but issuing in a circular plane parallel to the longitudinal axis of the burner and of the central air delivery pipe. All those parts of the orifice (of said last-mentioned device) which correspond to the divisions between the conduits are not subjected to any atomizing or spraying action of the steam. Unatomized oil is therefore subjected to combustion, which latter must necessarily be imperfect. In my invention the oxygen needed for combustion is supplied by the pressure and through the pipe used for feeding and atomizing the liquid oil.

The various features of my invention are preferably employed together; but one or more of them may be successfully employed without the remainder, and, in so far as applicable, one or more of said features may be employed in connection with devices for burning liquid fuel other than that specifically herein set forth.

What I claim as new and of my invention, and desire to secure by Letters Patent, is—

1. In a liquid-fuel burner, the combination of the liquid-fuel orifices inclined outward toward their respective discharging-points, and spraying air or gas or vapor conduits inclined toward the central portion of the burner and crossing the exit-opening of the said liquid-fuel orifices, substantially as and for the purposes specified.

2. In a device for the consumption of liquid fuel, the combination of the burner having fuel-orifices E, inclined, as shown, and spraying air or gas or vapor conduits inclined, as shown, and passing to one side of the axial center of the burner, each orifice E meeting its respective conduit, substantially as and for the purposes specified.

3. In a liquid-fuel burner, the distinct and independent orifices for the liquid fuel from a fuel-chamber, and surrounding distinct and independent orifices for the air or gas or vapor from an annular chamber surrounding the fuel-chamber, the fuel-orifices and the air or gas orifices being oppositely inclined, substantially as and for the purposes specified.

4. In a liquid-fuel burner, a circle of distinct and independent inclined liquid-fuel orifices, surrounded by a circle of distinct and independent air, gas, or vapor orifices oppositely inclined to the fuel-orifices, substantially as and for the purposes specified.

5. In a liquid-fuel burner, a circle of distinct and independent liquid-fuel orifices inclined upward and outward from the center and surrounded by a circle of distinct and independent air, gas, or vapor conduits inclined upward and inward, each stream of liquid fuel meeting its stream of air, vapor, or gas, substantially as and for the purposes specified.

6. In a liquid-fuel burner, the combination of two or more fuel-orifices inclined upward and outward from the axis of the burner, and arranged around the said axis, and two or more spraying air or gas or vapor conduits inclined upward and inward to one side of the axis of the burner, each stream of liquid fuel being crossed by its respective stream of air, vapor, or gas, substantially as and for the purposes specified.

7. In a liquid-fuel burner, the annularly-arranged oil-jets externally directed outwardly against their respective inclined air-jets, substantially as and for the purposes set forth.

8. In a liquid-fuel burner, the combination of fuel orifices or conduits and air, gas, or vapor conduits, the said conduits converging and meeting immediately at the outside of the burner, and being both inclined at an angle to the peripheral or circular planes in which the mouths of the conduits are located, said planes being parallel to the longitudinal axis of the burner, substantially as and for the purposes specified.

9. In a device for the consumption of liquid fuel, the combination of the burner having fuel-orifices E, inclined, as shown, and spraying air, gas, or vapor conduits inclined, as shown, and passing to one side of the center of the burner, each orifice E meeting its respective conduit, and conduit H, extending beyond its orifice E in the form of a groove, the part of the conduit H at one side of orifice E being inclined at one angle and the grooved part on the other side being inclined at another angle, substantially as and for the purposes specified.

10. In a device for the consumption of liquid fuel, the burner-tip provided with liquid-fuel orifices E, inclined substantially as shown, and with spraying air, gas, or vapor conduits inclined substantially as shown, the conduits being in the form of grooves in the surface of the tip, in combination with the cap provided with flange G', arranged to meet the tip at the grooves, and provided with air, gas, or vapor space below, and at the flange each conduit meeting its respective orifices E, substantially as and for the purposes specified.

11. In a device for the consumption of liquid fuel, the burner-tip provided with liquid-fuel orifices E, inclined substantially as shown, and with spraying air or gas or vapor conduits inclined substantially as shown, the conduits being in the form of grooves in the surface of the tip, in combination with the cap provided with flange G', arranged to meet the tip at the grooves, and provided with air or gas space below at the flange, each conduit meeting its respective orifice E, the part of the groove below the orifice E being inclined at one angle and the part of the groove in the other side of said orifice being inclined at another angle, substantially as and for the purposes specified.

12. In a liquid-fuel burner, the combination of the burner-head having the fuel-orifices E, and the spraying air or gas conduits and cup-shaped flange C, surmounting the burner-head, substantially as and for the purposes specified.

13. The combination, in a liquid-fuel burner, of the central liquid-fuel feed-tube terminating in fuel orifices, and the surrounding spraying air or gas or vapor feed-tube having space F, terminating above in spraying air or gas or vapor conduits located in the immediate vicinity of said fuel-orifices, and the supplemental air or gas or vapor conduits, located farther back from or lower down than the first-named conduits, substantially as and for the purposes specified.

CHARLES L. MITCHELL.

Witnesses:
O. M. HILL,
WALTER CHAMBERLIN.